United States Patent
Hirota et al.

(10) Patent No.: US 11,867,079 B2
(45) Date of Patent: Jan. 9, 2024

(54) FLANGE COOLING STRUCTURE FOR GAS TURBINE ENGINE

(71) Applicant: KAWASAKI JUKOGYO KABUSHIKI KAISHA, Kobe (JP)

(72) Inventors: Hayato Hirota, Kobe (JP); Tateki Sakimoto, Kobe (JP); Atsunori Arai, Kobe (JP); Tatsuya Okuwa, Kobe (JP); Hikaru Maesato, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 17/800,056

(22) PCT Filed: Feb. 18, 2021

(86) PCT No.: PCT/JP2021/006116
§ 371 (c)(1),
(2) Date: Aug. 16, 2022

(87) PCT Pub. No.: WO2021/167001
PCT Pub. Date: Aug. 26, 2021

(65) Prior Publication Data
US 2023/0080666 A1    Mar. 16, 2023

Related U.S. Application Data

(60) Provisional application No. 62/978,996, filed on Feb. 20, 2020.

(51) Int. Cl.
*F01D 5/08*    (2006.01)
*F01D 25/24*    (2006.01)
(Continued)

(52) U.S. Cl.
CPC ............ *F01D 5/082* (2013.01); *F01D 25/243* (2013.01); *F02C 7/18* (2013.01); *F23R 3/42* (2013.01);
(Continued)

(58) Field of Classification Search
CPC combination set(s) only.
See application file for complete search history.

(56) References Cited

U.S. PATENT DOCUMENTS

2006/0133924 A1* 6/2006 Kanezawa ............... F02C 7/12
                                                          415/115
2007/0059158 A1    3/2007 Alvanos et al.
(Continued)

FOREIGN PATENT DOCUMENTS

GB    1 282 142 A    7/1972
JP    53-16042 B1    5/1978
(Continued)

OTHER PUBLICATIONS

International Search Report for PCT/JP2021/006116, dated Apr. 27, 2021.

*Primary Examiner* — Binh Q Tran
(74) *Attorney, Agent, or Firm* — Sughrue Mion, PLLC

(57) ABSTRACT

In a flange cooling structure of a gas turbine engine, one of a first flange and a second flange is a high pressure flange that faces a first region, and the other of the first flange and the second flange is a low pressure flange that faces a second region. A contact surface of the high pressure flange or a contact surface of the low pressure flange includes a cooling groove that communicates with the first region and the second region.

7 Claims, 5 Drawing Sheets

(51) Int. Cl.
*F02C 7/18* (2006.01)
*F23R 3/42* (2006.01)
*F01D 25/08* (2006.01)
*F01D 25/12* (2006.01)
*F02C 7/12* (2006.01)
*F02C 7/32* (2006.01)

(52) U.S. Cl.
CPC .............. *F01D 5/081* (2013.01); *F01D 25/08* (2013.01); *F01D 25/12* (2013.01); *F01D 25/24* (2013.01); *F01D 25/246* (2013.01); *F02C 7/12* (2013.01); *F02C 7/32* (2013.01); *F05D 2260/20* (2013.01); *F05D 2260/39* (2013.01); *F23R 2900/03044* (2013.01); *F23R 2900/03045* (2013.01)

(56) References Cited

U.S. PATENT DOCUMENTS

| | | |
|---|---|---|
| 2007/0110565 A1 | 5/2007 | Montgomery et al. |
| 2008/0112793 A1 | 5/2008 | Lee et al. |
| 2008/0131261 A1* | 6/2008 | Lee ........................... F01D 9/04 415/115 |
| 2011/0129336 A1 | 6/2011 | Bonneau et al. |
| 2014/0072417 A1* | 3/2014 | Tsutsui ................ F04D 29/5806 415/180 |
| 2014/0290272 A1* | 10/2014 | Mulcaire ............... F04D 29/542 60/39.83 |
| 2015/0176430 A1* | 6/2015 | Szarvasy ................. F01D 25/12 60/796 |
| 2017/0227152 A1* | 8/2017 | Tyburcy .................. F01D 25/12 |
| 2018/0171953 A1* | 6/2018 | Wilson .................... F02M 61/14 |
| 2020/0056628 A1* | 2/2020 | Sakuma ................. F01D 25/08 |

FOREIGN PATENT DOCUMENTS

| | | |
|---|---|---|
| JP | 59-148445 U | 10/1984 |
| JP | 2007-077983 A | 3/2007 |
| JP | 2007-138933 A | 6/2007 |
| JP | 2011-522152 A | 7/2011 |
| JP | 2012-145116 A | 8/2012 |

* cited by examiner

FLANGE COOLING STRUCTURE FOR GAS TURBINE ENGINE

CROSS REFERENCE TO RELATED APPLICATIONS

This application is a National Stage of International Application No. PCT/JP2021/006116 filed Feb. 18, 2021, claiming priority based on U.S. Provisional Patent Application No. 62/978,996 filed Feb. 20, 2020, the entire contents of which are incorporated herein by reference.

TECHNICAL FIELD

The present disclosure relates to a flange cooling structure of a gas turbine engine.

BACKGROUND ART

A gas turbine engine in which a compressor, a combustor, and a turbine are arranged along a rotating shaft has been known.

CITATION LIST

Patent Literature

PTL 1: Japanese Laid-Open Patent Application Publication No. 2012-145116
PTL 2: Japanese Laid-Open Patent Application Publication No. 2007-138933

SUMMARY OF INVENTION

Technical Problem

According to gas turbine engines, in some cases, cost reduction and space saving of the entire engine are extremely important, and therefore, cost reduction and space saving of each part are extremely important. Since heat-resistant materials mainly containing a nickel group, a cobalt group, and the like are high in material costs and low in machinability, manufacturing costs tend to be high. Therefore, a method of not selecting the heat-resistant materials as much as possible even for a high-temperature portion of the gas turbine engine is required.

For example, a turbine nozzle is fastened through flanges to or is supported through a pin by a combustor case that is a comparatively low temperature part. In the case of the fastening through the flanges, to avoid the influence of heat from the turbine nozzle, a flange fastening structure is located away from the turbine nozzle by a certain distance, or the heat-resistant material is used as the material of the combustor case. In the former case, the occupied space of the engine increases by such extra distance. In the latter case, the material of the pin needs to be the heat-resistant material. In addition, the structure of the engine tends to be complex, and the engine tends to increase in size.

Solution to Problem

A flange cooling structure of a gas turbine engine according to one aspect of the present disclosure is a flange cooling structure of a gas turbine engine in which a compressor, a combustor, and a turbine are arranged along a rotating shaft. The flange cooling structure includes: a first member including a first main body and a first flange, the first main body defining a first space, the first flange projecting from the first main body, heat of the combustor being transferred to the first member; a second member including a second main body and a second flange, the second main body defining a second space between the first main body and the second main body, the second flange projecting from the second main body, the second member being lower in temperature than the first member during operation of the gas turbine engine; and fasteners that fasten the first flange and the second flange to each other to form a flange laminated body that divides the second space. The second space is lower in temperature than the first space during the operation of the gas turbine engine. The second space includes a first region located at one side of the flange laminated body and a second region located at the other side of the flange laminated body. The first region is higher in pressure than the second region during the operation of the gas turbine engine. One of the first flange and the second flange is a high pressure flange that faces the first region. The other of the first flange and the second flange is a low pressure flange that faces the second region. A contact surface of the high pressure flange or a contact surface of the low pressure flange includes a cooling groove that communicates with the first region and the second region.

According to the above configuration, while using the flange fastening structure for space saving and high rigidity, heat transfer from the high-temperature first member to the low-temperature second member is suppressed by air cooling at the flange contact surfaces. Therefore, the degree of freedom of the selection of the material of the second member improves, and this can reduce the manufacturing cost.

Advantageous Effects of Invention

According to one aspect of the present disclosure, the degree of freedom of the selection of the material of the second member improves, and this can reduce the manufacturing cost.

DESCRIPTION OF EMBODIMENTS

Hereinafter, embodiments will be described with reference to the drawings.

Figure 1:
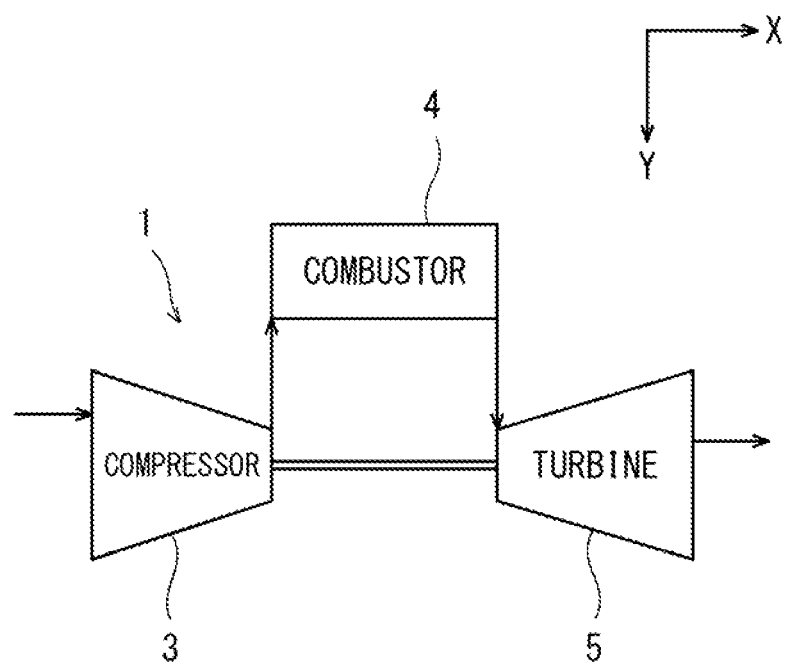
FIG. 1 is a schematic diagram of a gas turbine engine according to Embodiment 1.

FIG. 1 is a schematic diagram showing a gas turbine engine 1 according to Embodiment 1. As shown in FIG. 1, the gas turbine engine 1 includes a compressor 3, a combustor 4, and a turbine 5 which are arranged along a rotating shaft 2. Air compressed by the compressor 3 is combusted by the combustor 4, and its combustion gas rotates the turbine 5. Thus, the rotating shaft 2 is driven. A direction in which an axis of the rotating shaft 2 extends is referred to as an axial direction X. A direction orthogonal to the axial direction X is referred to as a radial direction Y. A direction around the rotating shaft 2 is referred to as a circumferential direction Z.

Figure 2:
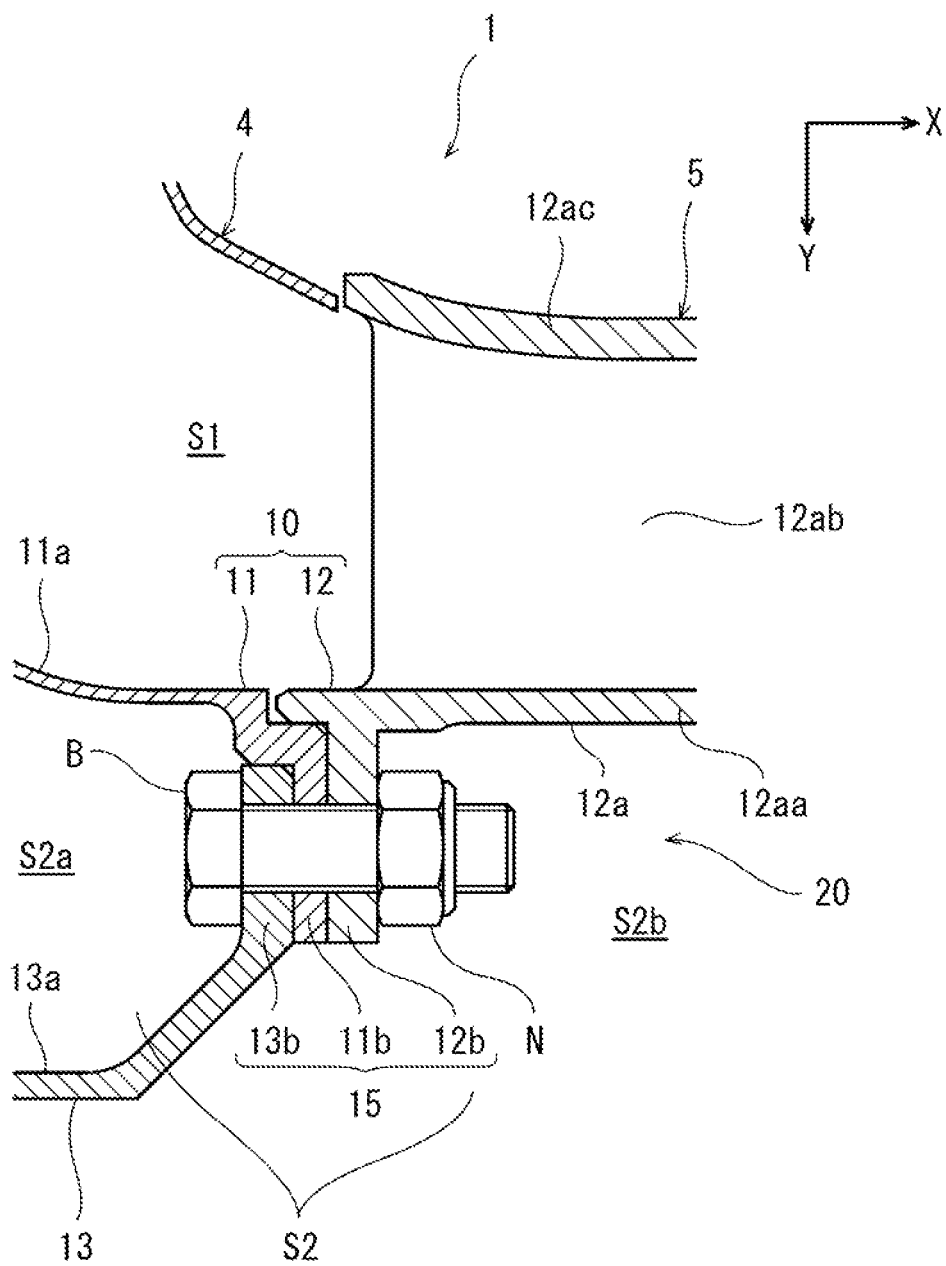
FIG. 2 is a sectional view of major components of the gas turbine engine of FIG. 1.

FIG. 2 is a sectional view of major components of the gas turbine engine 1 according to Embodiment 1. As shown in FIG. 2, the gas turbine engine 1 includes: a mainstream member 10 (first member) including a housing 11 of the combustor 4 and a stationary blade unit 12 of the turbine 5; and a combustor case 13 arranged outside the combustor 4.

The housing 11 of the combustor 4 includes: a housing main body 11a (first main body) defining a combustion gas space S1 (first space); and a combustor flange 11b (first flange) projecting from the housing main body 11a. The housing 11 is made of, for example, superalloy mainly containing a Fe group.

The stationary blade unit 12 includes a stationary blade unit main body 12a (first main body) and a stationary blade unit flange 12b (first flange) projecting from the stationary blade unit main body 12a. The stationary blade unit main body 12a includes an inner tube 12aa, an outer tube 12ac located away from the inner tube 12aa in the radial direction Y, and a turbine nozzle 12ab disposed between the inner tube 12aa and the outer tube 12ac. The turbine nozzle 12ab communicates with the combustion gas space S1. The turbine nozzle 12ab increases in temperature by the combustion gas flowing from the combustion gas space S1 during the operation of the gas turbine engine 1.

The stationary blade unit 12 is made of a material that is higher in heat resistance than the housing 11. The stationary blade unit 12 is made of a material that is higher in melting point than the housing 11. The housing 11 is made of, for example, superalloy mainly containing a Fe group. The stationary blade unit 12 is made of, for example, superalloy mainly containing a Ni group or superalloy mainly containing a Co group.

The combustor case 13 includes a case main body 13a (second main body) located away from the mainstream member 10 in the radial direction Y; and a case flange 13b (second flange) projecting from the case main body 13a. The combustor case 13 is lower in temperature than the mainstream member 10 during the operation of the gas turbine engine 1.

The case flange 13b, the combustor flange 11b, and the stationary blade unit flange 12b are laminated on each other in this order and are fastened to each other by plural pairs of bolts B and nuts N (fasteners) disposed at intervals in the circumferential direction Z. The case flange 13b, the combustor flange 11b, and the stationary blade unit flange 12b constitute a flange laminated body 15.

A compressed air space S2 (second space) through which the compressed air flowing from the compressor 3 flows is located outside the mainstream member 10. The compressed air space S2 is lower in temperature than the combustion gas space S1 during the operation of the gas turbine engine 1. The compressed air space S2 is divided by the flange laminated body 15 into a high pressure region S2a (first region) and a low pressure region S2b (second region). To be specific, the compressed air space S2 includes the high pressure region S2a located at one side of the flange laminated body 15 and the low pressure region S2b located at the other side of the flange laminated body 15.

The high pressure region S2a is defined by an inner surface of the combustor case 13, an outer surface of the housing 11, and the flange laminated body 15. The low pressure region S2b is defined by an outer surface of the combustor case 13, an outer surface of the stationary blade unit 12, and the flange laminated body 15. The compressed air of the high pressure region S2a is supplied to the combustor 4. The low pressure region S2b communicates with outside air. The high pressure region S2a is higher in pressure than the low pressure region S2b during the operation of the gas turbine engine 1.

The case flange 13b is a high pressure flange that faces the high pressure region S2a. A group of the combustor flange 11b and the stationary blade unit flange 12b is a low pressure flange that faces the low pressure region S2b. The case flange 13b, the combustor flange 11b, and the stationary blade unit flange 12b are laminated on each other in this order from the high pressure region S2a toward the low pressure region S2b. To be specific, the combustor flange 11b is sandwiched between the case flange 13b and the stationary blade unit flange 12b.

Figure 3:
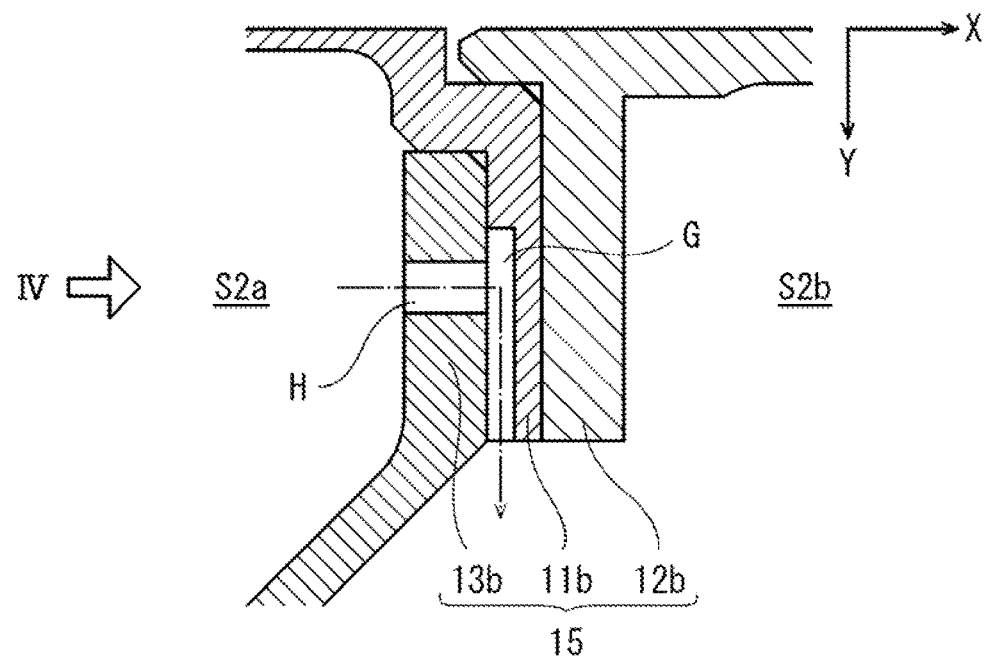
FIG. 3 is a sectional view of another section of a flange laminated body of FIG. 2.
Figure 4:
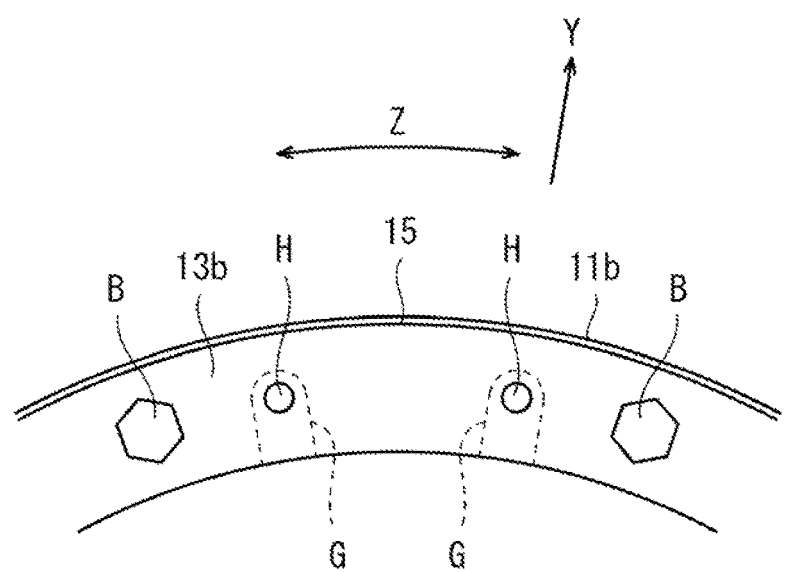
FIG. 4 is a diagram showing the flange laminated body when viewed from a direction indicated by an arrow IV in FIG. 3.

FIG. 3 is a sectional view of another section of the flange laminated body 15 of FIG. 2. FIG. 4 is a diagram showing the flange laminated body 15 when viewed from a direction indicated by an arrow IV in FIG. 3. As shown in FIGS. 3 and 4, a contact surface of the combustor flange 11b which surface faces the case flange 13b includes cooling grooves G. The cooling grooves G are open outward in the radial direction Y of the combustor flange 11b and communicate with the low pressure space S2b. A length of the cooling groove G in the radial direction Y of the combustor flange 11 is longer than half a length of the combustor flange 11 in the radial direction Y.

The case flange 13b includes cooling jet holes H that are open toward the combustor flange 11b from the high pressure region S2a. The cooling jet holes H are communication spaces through which the high pressure region S2a communicates with the cooling grooves G. The cooling jet hole H is smaller in diameter than a bolt hole of the case flange 13b into which the bolt B is inserted. A passage axis of the cooling jet hole H is practically orthogonal to a bottom surface of the cooling groove G of the combustor flange 11b.

When viewed from a laminating direction (axial direction X) of the flange laminated body 15, the cooling jet hole H is arranged so as to be contained in the cooling groove G. At least one cooling jet hole G is arranged between two adjacent bolts B among the bolts B. In the example of FIG. 4, the cooling jet holes G are arranged between two adjacent bolts B among the bolts B.

According to the above-described configuration, the compressed air of the high pressure region S2a flows through the cooling jet holes H of the case flange 13b of the combustor case 13, collides with (the bottom surfaces of the cooling grooves G of) the combustor flange 11b at high pressure, and flows out from the cooling grooves G to the low pressure region S2b. With this, the combustor flange 11b and the stationary blade unit flange 12b are cooled, and therefore, the increase in temperature of the case flange 13b by the heat from the high-temperature turbine nozzle 12ab is suppressed. To be specific, while using a flange fastening structure for space saving and high rigidity, heat transfer from the high-temperature stationary blade unit 12 to the low-temperature combustor case 13 is suppressed by air cooling at the flange contact surfaces. Therefore, the heat-resistant material does not have to be selected as the material of the combustor case 13, and an inexpensive material can be selected.

Moreover, the combustor flange 11b is sandwiched between the case flange 13b and the stationary blade unit flange 12b. To be specific, the stationary blade unit flange 12b that increases in temperature by the heat from the turbine nozzle 12ab is separated from the case flange 13b by the combustor flange 11b. Therefore, the increase in temperature of the case flange 13b by the heat from the high-temperature turbine nozzle 12ab can be further suppressed.

Embodiment 2

Figure 5:
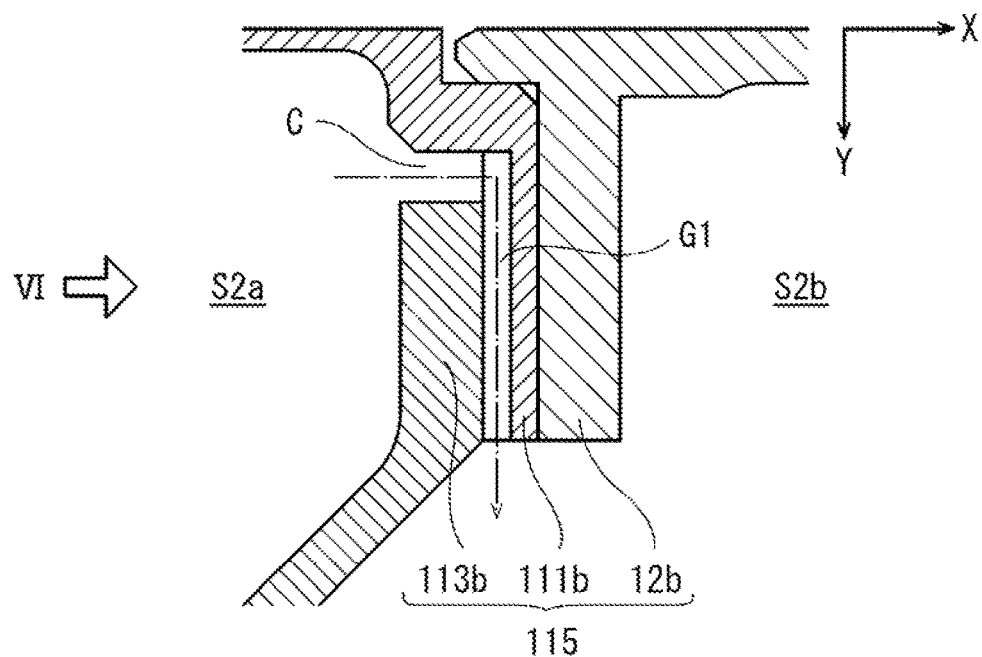
FIG. 5 is a sectional view showing the flange laminated body of Embodiment 2 and corresponding to FIG. 3.
Figure 6:
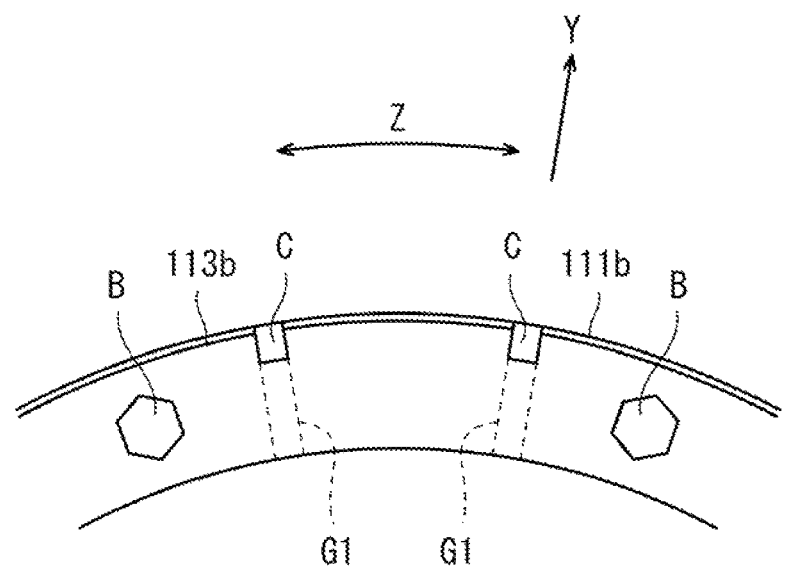
FIG. 6 is a diagram showing the flange laminated body when viewed from a direction indicated by an arrow VI in FIG. 5.

FIG. 5 is a sectional view showing a flange laminated body 115 of Embodiment 2 and corresponding to FIG. 3. FIG. 6 is a diagram showing the flange laminated body 115 when viewed from a direction indicated by an arrow VI in FIG. 5. The same reference signs are used for the same components as Embodiment 1, and the repetition of the same explanation is avoided. As shown in FIGS. 5 and 6, in the flange laminated body 115 of Embodiment 2, cooling jet cutouts C are used instead of the cooling jet holes H (FIG. 3).

The case flange 113b includes the cooling jet cutouts C arranged at intervals in the circumferential direction Z. The cooling jet cutouts C are formed by locally cutting an end surface of the case flange 113 in the radial direction Y and are open toward a combustor flange 111b from the high pressure region S2a. When viewed from the laminating direction (axial direction X) of the flange laminated body 15, the cooling jet cutout C overlaps a cooling groove G1 formed on a contact surface of the combustor flange 111b. In the example of FIG. 5, a length of the cooling groove G1 in the radial direction Y of the combustor flange 11 is practically the same as a length of the combustor flange 11 in the radial direction Y but may be shorter than the length of the combustor flange 11 in the radial direction Y.

According to the above configuration, the compressed air of the high pressure region S2a flows through the cooling jet cutouts C of the case flange 113b, collides with the combustor flange 111b at high pressure, and flows out from the cooling grooves G1 to the low pressure region S2b. With this, the combustor flange 111b and the stationary blade unit flange 12b are cooled, and therefore, the increase in temperature of the case flange 113b by the heat from the high-temperature turbine nozzle 12ab is suppressed. Since the other components are the same as those of Embodiment 1, explanations thereof are omitted.

Embodiment 3

Figure 7:
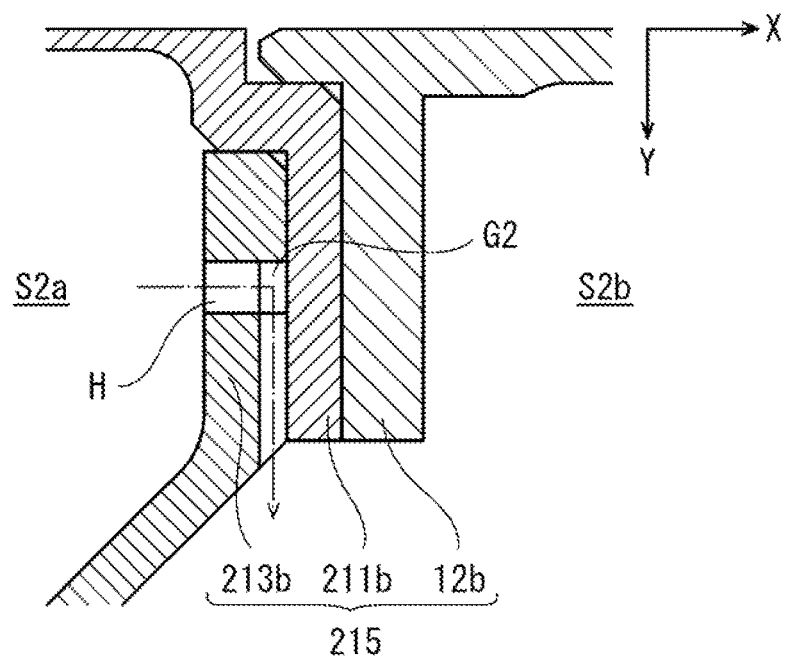
FIG. 7 is a sectional view showing the flange laminated body of Embodiment 3 and corresponding to FIG. 3.

FIG. 7 is a sectional view showing a flange laminated body 215 of Embodiment 3 and corresponding to FIG. 3. The same reference signs are used for the same components as Embodiment 1, and the repetition of the same explanation is avoided. As shown in FIG. 7, in the flange laminated body 215 of Embodiment 3, cooling grooves G2 are located at not a combustor flange 211 but a case flange 213b. To be specific, the cooling grooves G2 are formed on a contact surface of the case flange 213b which surface faces the combustor flange 211b. A contact surface of the combustor flange 211b which surface faces the case flange 213b is an entirely flat surface.

The case flange 213b includes the cooling jet holes H that are open toward the combustor flange 211b from the high pressure region S2a. The cooling jet holes H are communication spaces through which the high pressure region S2a communicates with the cooling grooves G2. The passage axis of the cooling jet hole H is practically orthogonal to the contact surface of the combustor flange 211b.

According to the above configuration, the compressed air of the high pressure region S2a flows through the cooling jet holes H of the case flange 213b, collides with the combustor flange 211b at high pressure, and flows out from the cooling grooves G2 to the low pressure region S2b. With this, the combustor flange 211b and the stationary blade unit flange 12b are cooled, and therefore, the increase in temperature of the case flange 213b by the heat from the high-temperature turbine nozzle 12ab is suppressed. The contact surface of the combustor flange 211b which surface faces the case flange 213b does not have to be a flat surface, and cooling grooves may be additionally formed on the contact surface of the combustor flange 211b. Since the other components are the same as those of Embodiment 1, explanations thereof are omitted.

Embodiment 4

Figure 8:
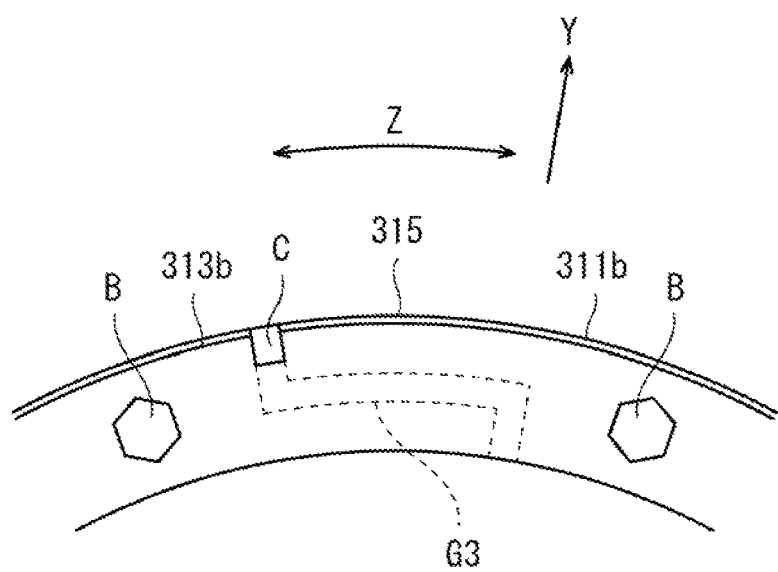
FIG. 8 is a diagram showing the flange laminated body of Embodiment 4 and corresponding to FIG. 4.

FIG. 8 is a diagram showing a flange laminated body 315 of Embodiment 4 and corresponding to FIG. 4. As shown in FIG. 8, in the flange laminated body 315 of Embodiment 4, a cooling groove G3 formed on a contact surface of a case flange 313b or a contact surface of a combustor flange 311b extends not only in the radial direction Y of the flange laminated body 315 linearly but also in the circumferential direction Z of the flange laminated body 315. With this, the length of the cooling groove G3 can be increased, and therefore, the cooling effect can be improved. In FIG. 8, the cooling jet cutout C is shown, but the cooling jet hole H may be adopted.

The present disclosure is not limited to the above-described embodiments, and modifications, additions, and eliminations may be made with respect to the configurations of the embodiments. For example, some of components or methods in an embodiment may be applied to another embodiment, and some of components in an embodiment may be separated and arbitrarily extracted from the other components in the embodiment. In the above embodiments, the combustor flange 11b, 111b, 211b is sandwiched between the case flange 13b, 113b, 213b and the stationary blade unit flange 12b. However, the stationary blade unit flange 12b may be sandwiched between the case flange 13b, 113b, 213b and the combustor flange 11b, 111b, 211b.

The invention claimed is:

1. A flange cooling structure of a gas turbine engine in which a compressor, a combustor, and a turbine are arranged along a rotating shaft, the flange cooling structure comprising:
a first member including a first main body and a first flange, the first main body defining a first space, the first flange projecting from the first main body, heat of the combustor being transferred to the first member;
a second member including a second main body and a second flange, the second main body defining a second space between the first main body and the second main body, the second flange projecting from the second main body, the second member being lower in temperature than the first member during operation of the gas turbine engine; and
fasteners that fasten the first flange and the second flange to each other to form a flange laminated body that divides the second space, wherein:

the second space is lower in temperature than the first space during the operation of the gas turbine engine;

the second space includes a first region located at one side of the flange laminated body and a second region located at the other side of the flange laminated body;

the first region is higher in pressure than the second region during the operation of the gas turbine engine;

one of the first flange and the second flange is a high pressure flange that faces the first region;

the other of the first flange and the second flange is a low pressure flange that faces the second region; and a contact surface of the high pressure flange or a contact surface of the low pressure flange includes a cooling groove that communicates with the first region and the second region.

2. The flange cooling structure according to claim 1, wherein the high pressure flange includes a communication space through which the first region communicates with the cooling groove.

3. The flange cooling structure according to claim 2, wherein the communication space is at least one cooling jet hole or cutout that is open toward the low pressure flange from the first region.

4. The flange cooling structure according to claim 3, wherein the cooling jet hole or the cutout is arranged between two adjacent fasteners among the fasteners.

5. The flange cooling structure according to claim 4, wherein the at least one cooling jet hole or cutout comprises cooling jet holes or cutouts arranged between the two adjacent fasteners.

6. The flange cooling structure according to claim 1, wherein:

the first member includes a housing of the combustor and a stationary blade unit of the turbine;

the second member includes a combustor case arranged outside the combustor;

the first flange includes a combustor flange of the combustor and a stationary blade unit flange of the stationary blade unit; and the second flange includes a case flange of the combustor case.

7. The flange cooling structure according to claim 6, wherein:

the case flange, the combustor flange, and the stationary blade unit flange are laminated on each other in this order from the first region toward the second region;

the cooling jet hole or the cutout is located at the case flange; and the cooling groove is located on a contact surface of the case flange or a contact surface of the combustor flange.

\* \* \* \* \*